(12) United States Patent
Liew et al.

(10) Patent No.: US 8,298,609 B1
(45) Date of Patent: Oct. 30, 2012

(54) METHOD AND SYSTEM FOR INTERROGATING THE THICKNESS OF A CARBON LAYER

(75) Inventors: Lee Chu Liew, Gelugor (MY); Chin Y. Poon, Santa Clara, CA (US)

(73) Assignee: WD Media, Inc., San Jose, CA (US)

( * ) Notice: Subject to any disclaimer, the term of this patent is extended or adjusted under 35 U.S.C. 154(b) by 316 days.

(21) Appl. No.: 12/815,273

(22) Filed: Jun. 14, 2010

(51) Int. Cl.
*C23C 14/52* (2006.01)
*C23C 16/52* (2006.01)

(52) U.S. Cl. .......... 427/9; 427/8; 427/58; 427/128; 427/131

(58) Field of Classification Search .......... 427/8, 9, 427/58, 128, 131
See application file for complete search history.

(56) References Cited

U.S. PATENT DOCUMENTS

| | | |
|---|---|---|
| 5,273,788 A | 12/1993 | Yu |
| 5,994,035 A | 11/1999 | Tsukamoto et al. |
| 6,046,758 A | 4/2000 | Brown et al. |
| 6,447,652 B1 | 9/2002 | Amano et al. |
| 6,490,136 B1 | 12/2002 | Ito et al. |
| 6,504,294 B1 | 1/2003 | Mahoney et al. |
| 6,913,780 B2 | 7/2005 | Kato et al. |
| 6,956,658 B2 | 10/2005 | Meeks et al. |
| 7,087,980 B2 * | 8/2006 | Ebata et al. ............ 257/586 |
| 7,537,846 B2 | 5/2009 | Ishiyama et al. |
| 7,582,868 B2 | 9/2009 | Jiang et al. |
| 8,164,760 B2 | 4/2012 | Willis |
| 2005/0089648 A1 | 4/2005 | Yamazaki et al. |
| 2006/0077593 A1 | 4/2006 | Ueda |
| 2009/0185193 A1 | 7/2009 | Munteanu et al. |

FOREIGN PATENT DOCUMENTS

WO 2008/099394 A2 8/2008

OTHER PUBLICATIONS

Whitley, Andrew. The Use of Raman Spectroscopy to Monitor the Quality of Carbon Overcoats in the Disk Drive Industry. 2001.*
Ewen Smith, et al., "Modern Raman Spectroscopy—A Practical Approach", John Wiley & Sons, Ltd., (ISBN 0-471-49794-0), Reprinted May 2006, Section in Chapter 5 entitled "Application of SERS", pp. 122-126.

* cited by examiner

*Primary Examiner* — David Turocy

(57) ABSTRACT

A method and system for interrogating a thickness of a carbon layer are described. The carbon layer is on a magnetic media having an underlayer and at least one magnetic layer on the underlayer. The carbon layer resides on the magnetic layer(s). A sample underlayer is deposited on a sample substrate and a sample carbon layer provided on the sample underlayer. The sample substrate corresponds to a substrate including the magnetic media. The sample underlayer corresponds to the underlayer of the magnetic media. The sample carbon layer corresponds to the carbon layer. A region between the sample carbon layer and the sample underlayer is free of magnetic material. The sample substrate including the sample carbon layer is exposed to light. Emitted light from the sample substrate is detected to provide a Raman spectrum. The thickness of the carbon layer is determined based on the Raman spectrum.

18 Claims, 5 Drawing Sheets

Raman Shift

METHOD AND SYSTEM FOR INTERROGATING THE THICKNESS OF A CARBON LAYER

BACKGROUND

FIG. 1 depicts a portion of the magnetic media 10, which may be a hard disk. The media resides on a substrate 12 and includes a number of layers. A conventional soft underlayer (SUL) 14 and conventional Ta underlayer 16 reside on the substrate 12. The conventional SUL 14 may include multiple layers. Conventional magnetic layers 18 are on the conventional Ta underlayer. For example, a NiW layer 20, a Ru layer 22, and a bottom magnetic layer 24 as well as capping layers 26 and 28. Carbon layer 30 reside on the magnetic layers 18. The first carbon layer 32 may be deposited using chemical vapor deposition (CVD). The top carbon layer 34 may be sputtered. The carbon layers 32 and 34 may be a diamond-like carbon (DLC). The carbon layers 32 and 34 together may form a carbon overcoat layer 30 for the conventional media 10.

As part of characterizing the conventional media 10, the conventional carbon overcoat layer 30 is investigated. For example, the thickness of the conventional carbon overcoat layer 30 is desired to be experimentally determined.

FIG. 2 is a flow chart depicting a conventional method 50 for determining the thickness of a carbon layer, such as the conventional carbon overcoat layer 30. For simplicity, some steps are omitted. The carbon layer 30 is exposed to light used for Raman spectroscopy, via step 52. For example, the carbon layer 30 may be exposed by laser light. Light emitted from the carbon layer 30 is detected and used provide a Raman spectrum, via step 54. Typically, the Raman spectrum includes one or more peaks around frequencies specific to the carbon layer 30. Based on the spectrum, the thickness, d, of the carbon layer 30 is determined, via step 56. The spectrum may be curve fitted to determine the contribution of the D and G bands. In particular, the total area of the portion of the Raman spectrum corresponding to the D and G bands (Raman Tarea) may be used to determine the thickness of the conventional carbon overcoat layer 30.

Although the conventional method 50 may be able to determine the thickness for some media, there may be drawbacks. In particular, the Raman Tarea may be affected by layers under the carbon overcoat layer 30. For example, the roughness of films under the carbon overcoat layer 30 may significantly increase the noise in the Raman spectrum. For certain media, such as perpendicular magnetic recording (PMR) media, the contribution of the roughness by the magnetic layers 18 is significant. This noise may change the Raman Tarea calculated and thus the carbon layer thickness determination. As a result, determining the thickness of the carbon layer 30 may be difficult using conventional Raman spectroscopy.

SUMMARY

A method and system for interrogating a thickness of a carbon layer are described. The carbon layer is on a magnetic media having an underlayer and at least one magnetic layer on the underlayer. The carbon layer resides on the magnetic layer(s). A sample underlayer is deposited on a sample substrate and a sample carbon layer provided on the sample underlayer. The sample substrate corresponds to a substrate including the magnetic media. The sample underlayer corresponds to the underlayer of the magnetic media. The sample carbon layer corresponds to the carbon layer. A region between the sample carbon layer and the sample underlayer is free of magnetic material. The sample substrate including the sample carbon layer is exposed to light. Emitted light from the sample substrate is detected to provide a Raman spectrum. The thickness of the carbon layer is determined based on the Raman spectrum.

DETAILED DESCRIPTION OF THE PREFERRED EMBODIMENTS

Figure 1:
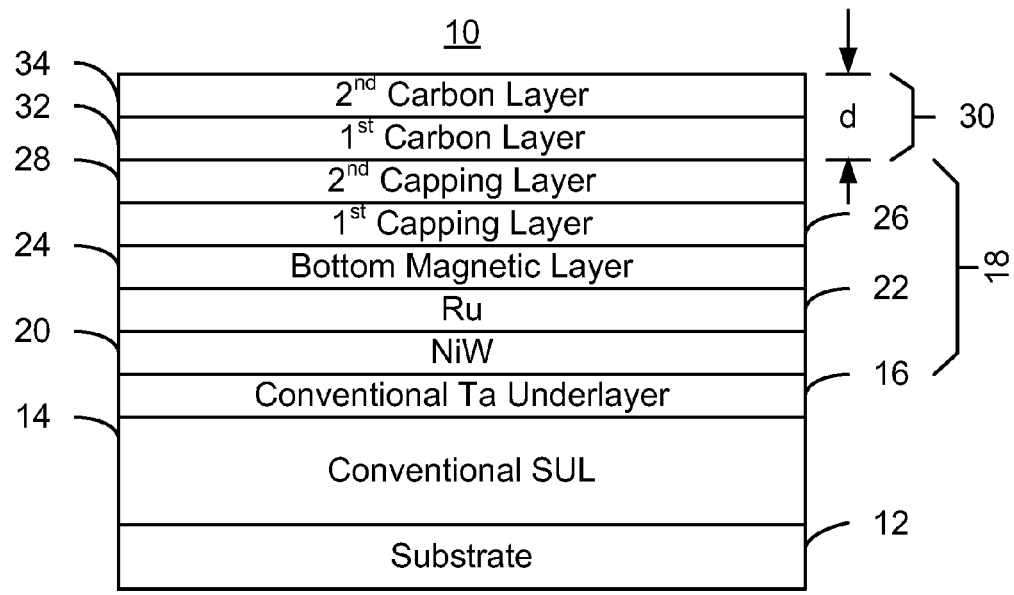
FIG. 1 is a diagram depicting a portion of a conventional PMR media.
Figure 2:
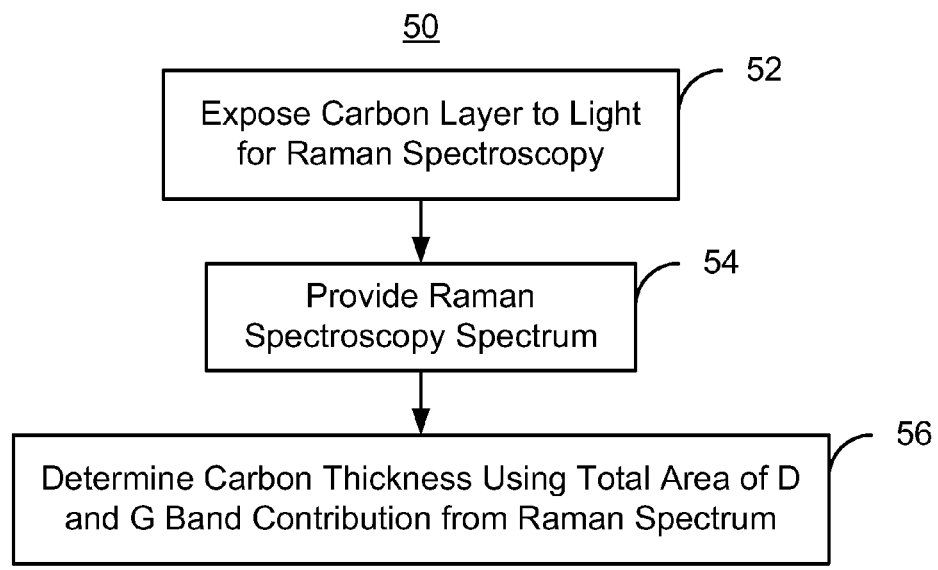
FIG. 2 is a flow chart depicting a conventional method for determining the thickness of a conventional carbon overcoat layer.
Figure 3:
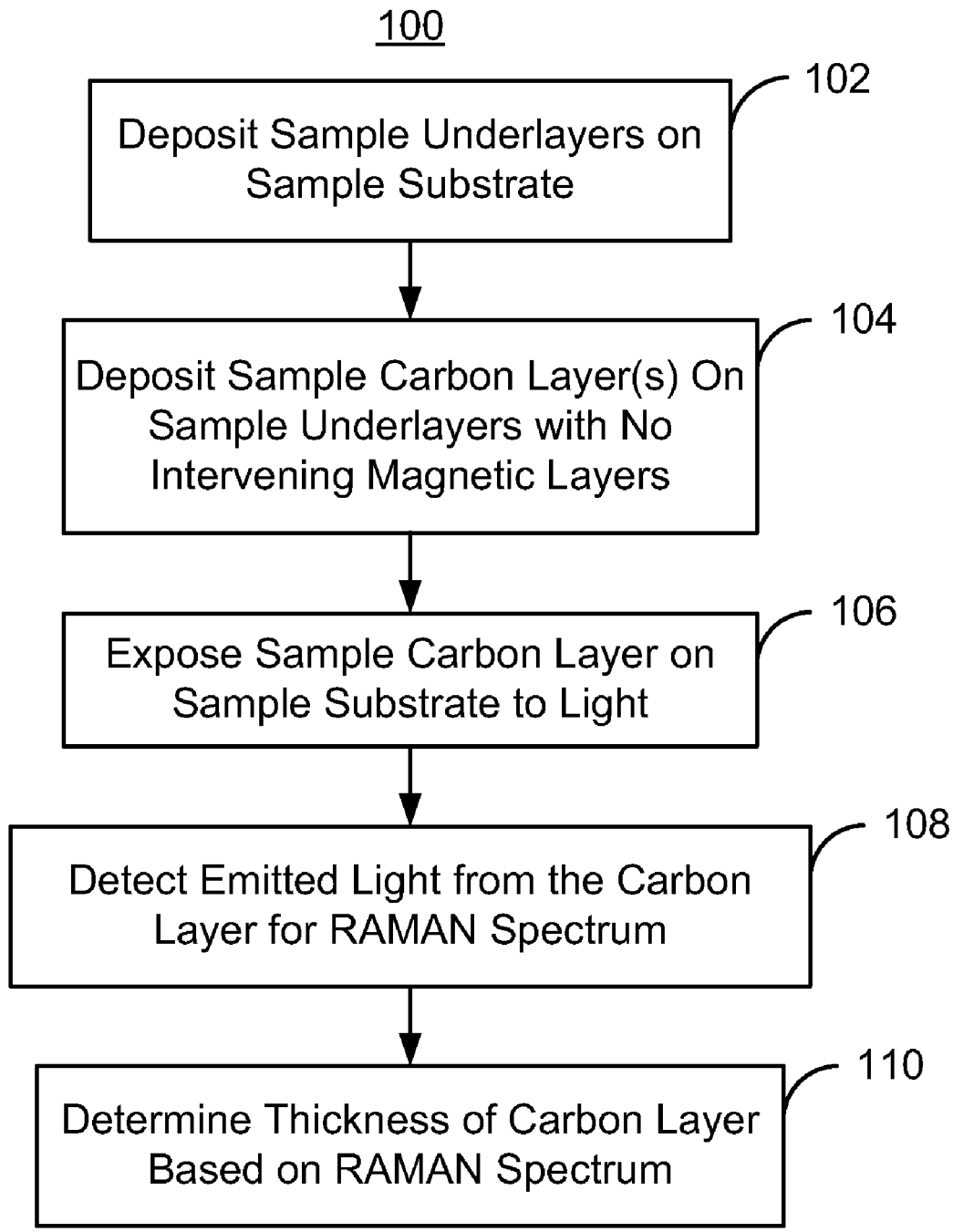
FIG. 3 is a flow chart depicting an exemplary embodiment of a method for determining the thickness of a carbon layer in a magnetic recording media.

FIG. 3 is a flow chart depicting an exemplary embodiment of a method 100 for interrogating the thickness of a carbon layer on a substrate. For simplicity, some steps may be omitted and/or combined. The carbon layer is used in a disk drive. For example, the carbon layer may be a DLC other carbon overcoat layer on a media or other structure. The carbon layer may reside on underlying structures. For example, the carbon layer may be on magnetic or other layers used to store data on the media. These layers reside on the substrate. In some embodiments, the carbon layer may be not more than fifteen Angstroms. In other embodiments, the carbon layer has a thickness of at least fifteen Angstroms. Further, in some such embodiments, the carbon layer may have a thickness of at least fifteen and not more than twenty-five Angstroms. In some embodiments, the carbon layer may also be discontinuous. In addition, in some embodiments, the carbon layer includes multiple carbon layers. For example, the carbon layer of interest may include a CVD deposited carbon layer and a sputtered carbon layer.

Sample underlayers are deposited on a sample substrate, via step 102. The substrate corresponds to the substrate on which the carbon layer of interest resides. For example, the sample substrate may be a different substrate that is of the same type as the substrate used. For example, if an AlTiC substrate is used for the media, the sample substrate may also be an AlTiC substrate. The sample underlayers correspond to the underlayers on which the carbon layer resides. For example, the sample underlayers may include soft underlayers. A soft underlayer includes one or more magnetic layers having a coercivity of not more than ten Oe. The sample underlayers may include a nonmagnetic underlayer, such as a Ta underlayer. The sample underlayers may also include both soft magnetic and nonmagnetic underlayers. The sample underlayers may be deposited in the same manner as the underlayers for the carbon layer.

One or more sample carbon layers are provided on the sample underlayers, via step 104. The sample carbon layer(s) correspond to the carbon layer of interest. In some embodiments, step 104 includes depositing a first carbon layer through CVD and sputtering a second carbon layer. The region between the sample carbon layer and the sample underlayer is free of magnetic material. In some embodiments, the sample carbon layer(s) are deposited directly on the sample underlayers. Step 104 is performed in line with fabrication of the carbon layer. For example, in the fabrication process, deposition of intervening magnetic layers may simply be skipped for the sample. Thus, providing the sample carbon layer in step 104 may be performed substantially simultaneously as the carbon layer of the magnetic media. In addition, because it is deposited in the same manner, the sample carbon layer should have substantially the same thickness as the carbon layer of interest.

Figure 4:
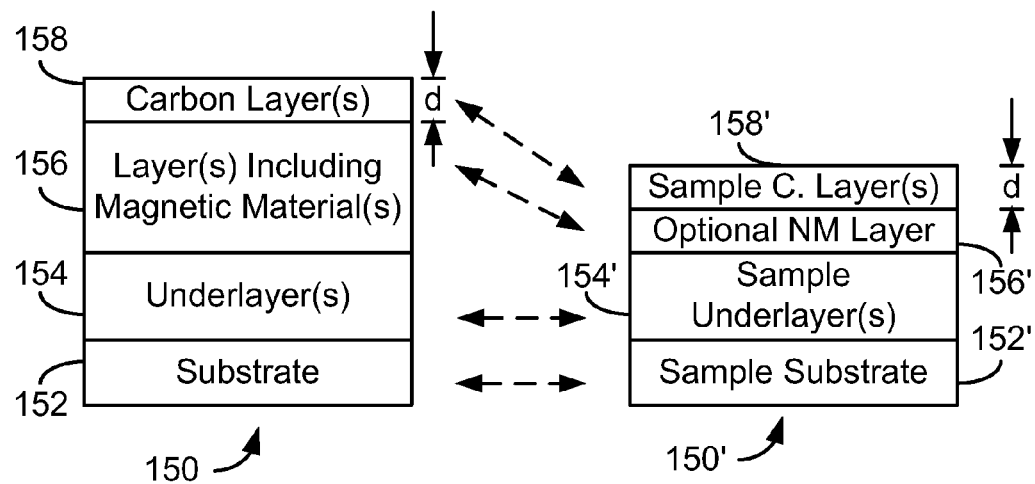
FIG. 4 is a diagram depicting an exemplary embodiment of the sample and corresponding media.

FIG. 4 depicts a media 150 and an exemplary embodiment of a corresponding sample 150' fabricated in steps 102 and 104. For clarity, FIG. 4 is not to scale. In some embodiments, the media 150 is a PMR media. The media 150 includes a substrate 152, underlayer(s) 154, intervening layer(s) 156, and carbon layer 158. The intervening layer(s) 156 include one or more magnetic layers. The sample 150' resides on a sample substrate 152' and includes sample underlayer(s) 154', optional nonmagnetic layer(s) 156', and sample carbon layer(s) 158'. The sample substrate 152' corresponds to the substrate 152. Thus, the same substrate may be used for the sample 150' as for the media 150. For example, in a manufacturing facility, the sample substrate 152' may simply be a substrate that would be used for the media 150. The sample underlayer(s) 154' correspond to one or more of the underlayer(s) 154. Thus, the sample underlayer(s) 154' may be fabricated in the same manner as the underlayer(s) 154. The optional nonmagnetic layer 156' may correspond to some of the layer(S) 156. However, the optional nonmagnetic layer 156' should not adversely affect the roughness of the sample carbon layer(s) 158'. The sample carbon layer(s) 158' correspond to and are fabricated in an analogous manner to the carbon layer 158. For example, the sample 150' may be manufactured in the same manner as the media 150, but with one or more of the deposition step(s) used in forming the layer(s) 156 skipped. This may be accomplished without loading and/or unloading the sample substrate 152' in the middle of production. Instead, the substrate 152' may be loaded at the start of production as is the substrate 152. However, one or more of the layer(s) 156 are not deposited onto the sample underlayer(s) 154'. In some embodiments, the optional layer(s) 156' are omitted. Thus, the sample 150' may be formed by skipping all deposition steps between formation of the underlayer(s) 154' and formation of the carbon layer(s) 158'. As a result, the sample underlayer(s) 154' and the sample carbon layer(s) 158' may be fabricated at substantially the same time as the underlayer(s) 154 and the carbon layer(s) 158, respectively. For example, the media 150 may be fabricated at a facility in shifts, such as twelve-hour shifts. Once a shift or twice a shift, the steps of depositing one or more of the layer(s) 156 may be skipped for a particular media being processed. Thus, the sample 150' may be generated once or twice a shift in line with multiple versions of the media 150. In other embodiments, the frequency with which the samples 150' are generated may differ.

Referring back to FIGS. 3-4, after fabrication, the sample 150' is used to interrogate the thickness of the carbon layer 158 using Raman spectroscopy. Thus, the sample 150' is exposed to light from a light source, such as a laser, via step 106. In some embodiments, the laser light may be attenuated, polarized, or otherwise processed prior to entering the sample 150'. Further, different portions of the sample 150' may be interrogated in step 106. Thus, the laser light may be incident on different portions of the sample 150'.

Light emitted from the sample 150' is detected to provide a Raman spectrum, via step 108. In some embodiments, the light from the sample 150' may be collimated or otherwise processed prior to being detected. Further, data may be collected from different portions of the sample 150' in step 108. The light emitted from the sample 150' has a frequency shift that is characteristic of the material(s) from which the incident light is scattered. Thus, one or more Raman spectra for the carbon layer(s) 158' may be obtained.

Figure 5:
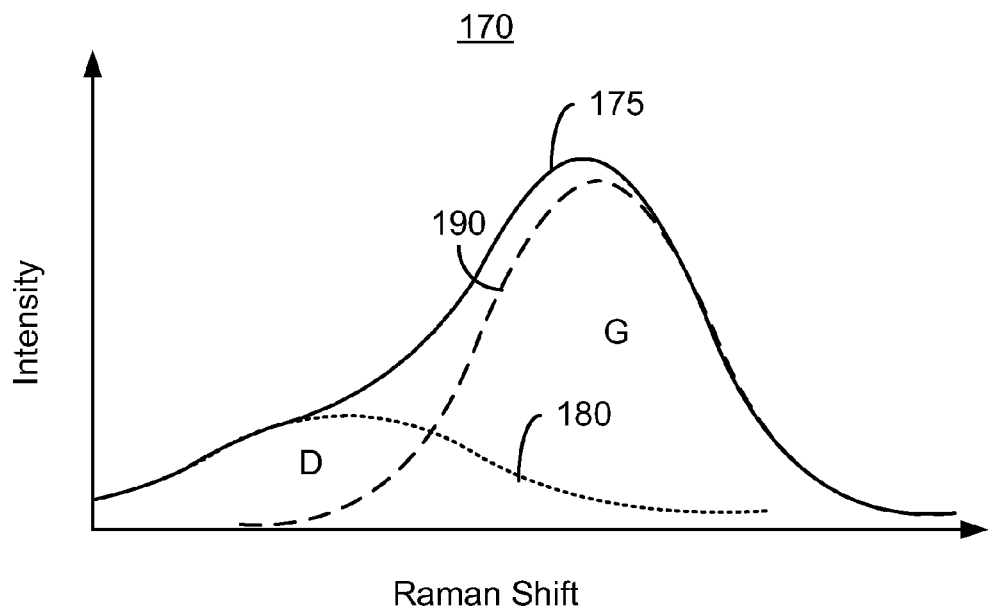
FIG. 5 is a diagram depicting the Raman spectrum used.

FIG. 5 depicts a graph 170 of an exemplary embodiment of a Raman spectrum 175 obtained in step 108. The graph 170 is for explanatory purposes only, and is not intended to depict data for a particular carbon layer. The spectrum 175 corresponds to the sample carbon layer 158'. In addition, the spectrum 175 may be considered to have a D band contribution 180 and a G band contribution 190, which correspond to the D band and G band, respectively, of carbon.

Referring back to FIGS. 3-5, the thickness of the sample carbon layer 158', and thus the carbon layer 158, may be determined based on the Raman spectra, via step 110. In some embodiments, this determination is made using the total area under the curves for the D-band contribution 180 and the G-band contribution 190.

Thus, using the method 100, the thickness of the sample carbon layer 158' may be determined via Raman spectroscopy. Because the sample carbon layer 158' corresponds to the carbon layer 158, the thickness of the carbon layer 158 may also be determined. In the embodiments shown in FIGS. 3-5, the carbon layers 158 and 158' are formed in the same manner and thus have substantially the same thickness, d. Thus, the thickness of the carbon layers 158/158', such as a carbon overcoat layer, may be determined. Because the magnetic and other layers 156 which increase surface roughness are omitted in the sample 150', Raman spectroscopy for the sample 150' is not adversely affected. Thus, Raman spectroscopy is capable of providing a sufficiently accurate determination of the thickness of the carbon layer(s) 158 and 158'. The thickness determination may be used in monitoring of wear of the media 150, analysis of the reliability of the carbon layer(s) 158 and 158', and in process development to optimizing coating. In addition, because the steps of depositing the layer(s) 156 are simply omitted for the sample 150', the preparation of the sample 150' is simplified.

Figure 6:
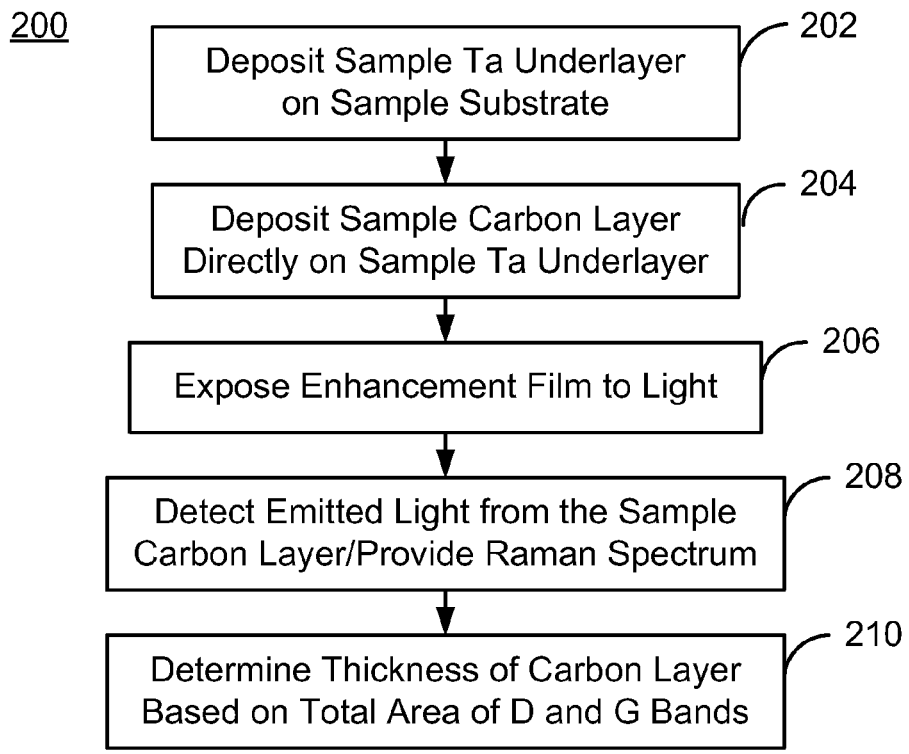
FIG. 6 is a flow chart depicting another exemplary embodiment of a method for determining the thickness of a carbon layer in a media.

FIG. 6 is a flow chart depicting another exemplary embodiment of a method 200 for determining the thickness of a carbon layer in a media. For simplicity, some steps may be omitted and/or combined. The carbon layer is used in a disk drive. For example, the carbon layer may be a DLC other carbon overcoat layer on a media or other structure. The carbon layer may reside on underlying structures. For example, the carbon layer may be on magnetic or other layers used to store data on the media. These layers reside on the substrate. In some embodiments, the carbon layer may be not more than fifteen Angstroms. In other embodiments, the carbon layer has a thickness of at least fifteen Angstroms. Further, in some such embodiments, the carbon layer may have a thickness of at least fifteen and not more than twenty-five Angstroms. In some embodiments, the carbon layer may also be discontinuous. In addition, in some embodiments, the carbon layer includes multiple carbon layers. For example, the carbon layer of interest may include a CVD deposited carbon layer and a sputtered carbon layer.

Figure 7:
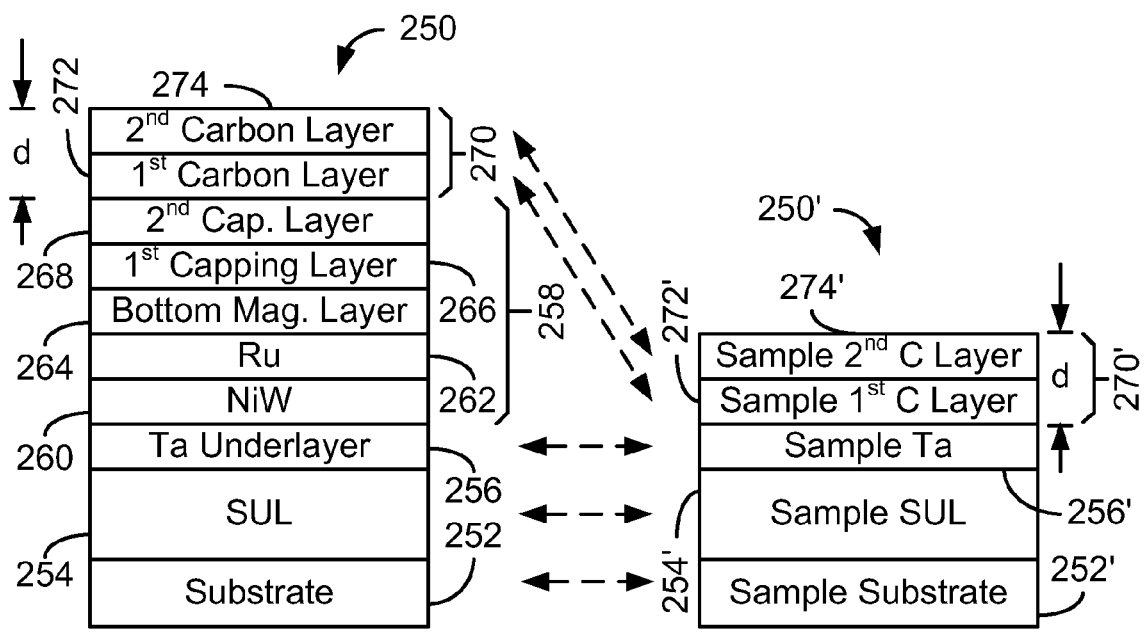
FIG. 7 is a diagram depicting another exemplary embodiment of a sample and corresponding media.

FIG. 7 is a diagram depicting another exemplary embodiment of a sample 250' and corresponding media 250 that correspond to the method 200. For clarity, FIG. 7 is not to scale. The media 250 resides on a substrate 252 and includes soft underlayer(s) 254 and a Ta underlayer 256. The media also includes magnetic layers 258 and carbon layers 270. The magnetic layers 258 includes a NiW layer 260, a Ru layer 262, a bottom magnetic layer 264, and capping layers 266 and 268. These magnetic layers 258 may be used to store data. The carbon layer 270 include a first, CVD deposited carbon layer 272 and a second, sputtered carbon layer 274. The sample 250' resides on a sample substrate 252' and includes sample soft underlayer(s) 254, a sample Ta underlayer 256', a first, CVD deposited sample carbon layer 272', and a second CVD deposited sample carbon layer 274'. The carbon layers 272' and 274' form carbon layer 270'.

Referring to FIGS. 6-7, a sample Ta underlayer 256' is deposited on the sample substrate 252', via step 202. The sample substrate 252' corresponds to the substrate 252 on which the carbon layer 270 of interest resides. The sample Ta underlayer 256' corresponds to the Ta underlayer 256. In the embodiment shown, the sample Ta layer 256' is deposited on the sample soft underlayer(s) 254'. The sample soft underlayer(s) 254' correspond to the soft underlayer(s) 254. The sample Ta underlayer 256' may be deposited in the same manner as the Ta underlayer 256. Step 202 may be performed in line with fabrication of the Ta underlayer 256.

Sample carbon layers 272' and 274' are provided on the sample Ta underlayer 256', via step 204. The sample carbon layers 272' and 274' correspond to the carbon layers 272 and 274. Thus, the thickness of layers 270 is substantially the same as the thickness of sample carbon layers 270'. Step 204 includes depositing the first sample carbon layer 272' through CVD and sputtering the second sample carbon layer 274'. The region between the sample carbon layer 270' and the sample Ta underlayer 256' is free of magnetic material. In the embodiment shown, the sample carbon layer 270 is deposited directly on the sample Ta underlayer. Step 204 is performed in line with fabrication of the carbon layer 270. For example, in the fabrication process, deposition of intervening magnetic layers 258 may simply be skipped for the sample 250'. Thus, providing the sample carbon layer 270' may be performed substantially simultaneously as the carbon layer 270 of the magnetic media 250. In addition, because it is deposited in the same manner, the sample carbon layer 270' should have substantially the same thickness as the carbon layer 270.

After fabrication, the sample 250' is used to interrogate the thickness of the carbon layer 258 using Raman spectroscopy. Thus, the sample 250' is exposed to light from a light source, such as a laser, via step 206. In some embodiments, the laser light may be processed prior to entering the sample 250'. Further, different portions of the sample 250' may be interrogated in step 206. Thus, the laser light may be incident on different portions of the sample 250'.

Light emitted from the sample 250' is detected to provide a Raman spectrum, via step 208. In some embodiments, the light from the sample 250' may be processed prior to being detected. Further, data may be collected from different portions of the sample 250' in step 208. The light emitted from the sample 250' has a frequency shift that is characteristic of the material(s) from which the incident light is scattered. Thus, one or more Raman spectra for the carbon layer(s) 270' may be obtained. The thickness of the sample carbon layer 270', and thus the carbon layer 270, may be determined based on the Raman spectra, via step 210. In some embodiments, this determination is made using the total area under the curves for the D-band contribution 180 and the G-band contribution.

The method 200 has analogous benefits as the method 100. Thus, the thickness of the sample carbon layer 270' may be determined via Raman spectroscopy. Because the sample carbon layer 270' corresponds to the carbon layer 270, the thickness of the carbon layer 270 may also be determined. Because the magnetic and other layers 258 which increase surface roughness are omitted in the sample 250', Raman spectroscopy for the sample 250' is not adversely affected. Thus, Raman spectroscopy is capable of providing a sufficiently accurate determination of the thickness of the carbon layer(s) 270 and 270'. The thickness determination may be used in monitoring of wear of the media 250, analysis of the reliability of the carbon layers 270 and 270', and in process development to optimizing carbon overcoats. In addition, because the steps of depositing the layer(s) 258 are simply omitted for the sample 250', the preparation of the sample 250' is simplified.

Figure 8:
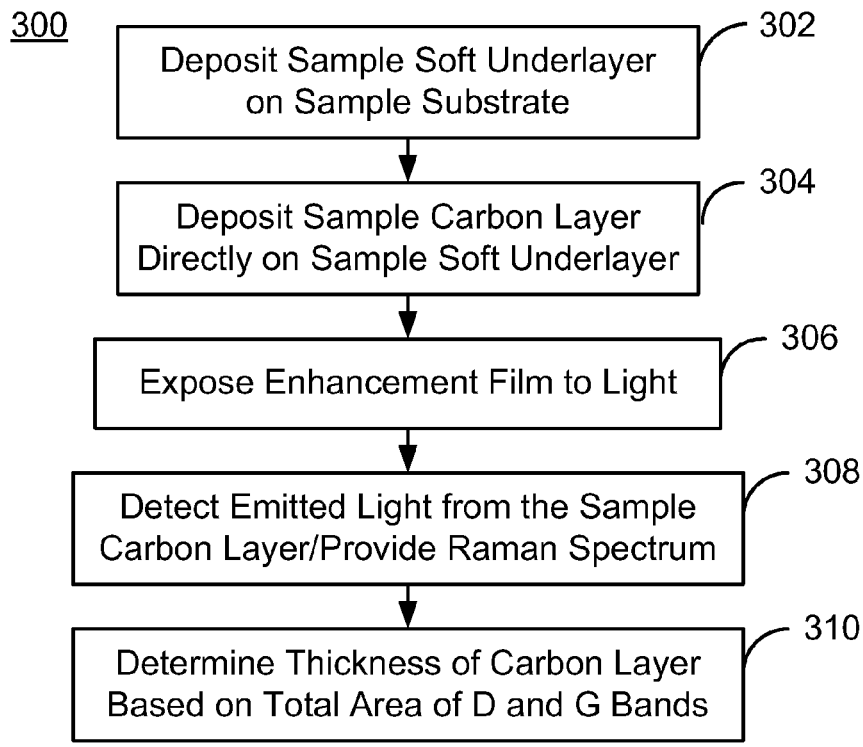
FIG. 8 is a flow chart depicting another exemplary embodiment of a method for determining the thickness of a carbon layer in a media.

FIG. 8 is a flow chart depicting another exemplary embodiment of a method 300 for determining the thickness of a carbon layer in a media. For simplicity, some steps may be omitted and/or combined. The carbon layer is used in a disk drive. For example, the carbon layer may be a DLC other carbon overcoat layer on a media or other structure. The carbon layer may reside on underlying structures. For example, the carbon layer may be on magnetic or other layers used to store data on the media. These layers reside on the substrate. In some embodiments, the carbon layer may be not more than fifteen Angstroms. In other embodiments, the carbon layer has a thickness of at least fifteen Angstroms. Further, in some such embodiments, the carbon layer may have a thickness of at least fifteen and not more than twenty-five Angstroms. In some embodiments, the carbon layer may also be discontinuous. In addition, in some embodiments, the carbon layer includes multiple carbon layers. For example, the carbon layer of interest may include a CVD deposited carbon layer and a sputtered carbon layer.

Figure 9:
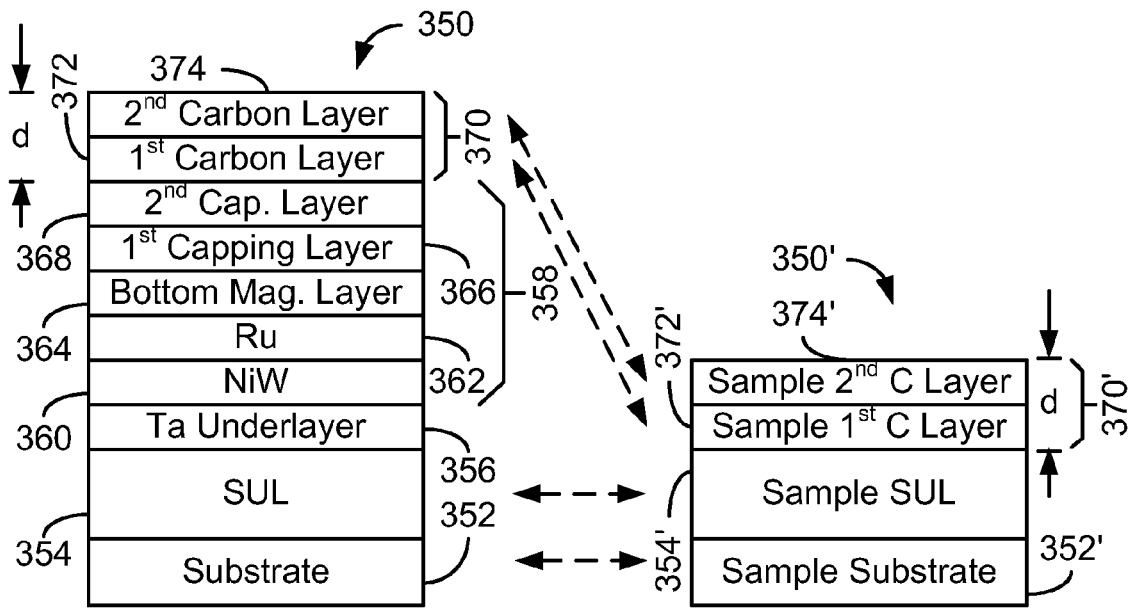
FIG. 9 is a diagram depicting another exemplary embodiment of a sample and corresponding media.

FIG. 9 is a diagram depicting another exemplary embodiment of a sample 350' and corresponding media 350 that correspond to the method 300. For clarity, FIG. 9 is not to scale. The media 350 resides on a substrate 352 and includes soft underlayer(s) 354 and a Ta underlayer 356. The media also includes magnetic layers 358 and carbon layers 370. The magnetic layers 358 includes a NiW layer 360, a Ru layer 362, a bottom magnetic layer 364, and capping layers 366 and 368. These magnetic layers 358 may be used to store data. The carbon layer 370 include a first, CVD deposited carbon layer 372 and a second, sputtered carbon layer 374. The sample 350' resides on a sample substrate 352' and includes sample soft underlayer(s) 354, a first, CVD deposited sample carbon layer 372', and a second CVD deposited sample carbon layer 374'. The carbon layers 372' and 374' form carbon layer 370'.

Referring to FIGS. 8-9, a sample soft underlayer 354' is deposited on the sample substrate 352', via step 302. The sample substrate 352' corresponds to the substrate 352 on which the carbon layer 370 of interest resides. The sample soft underlayer 354' corresponds to the soft underlayer 354. The sample soft underlayer 354' may be deposited in the same manner as the soft underlayer 354. Step 302 may be performed in line with fabrication of the soft underlayer 354.

Sample carbon layers 372' and 374' are provided on the soft underlayer 354', via step 304. The sample carbon layers 372' and 374' correspond to the carbon layers 372 and 374. Thus, the thickness of layers 370 is substantially the same as the thickness of sample carbon layers 370'. Step 304 includes depositing the first sample carbon layer 372' through CVD and sputtering the second sample carbon layer 374'. The region between the sample carbon layer 370' and the sample soft underlayer 354' is free of magnetic material. In the embodiment shown, the sample carbon layer 370' is deposited directly on the sample soft underlayer 354'. Step 304 is performed in line with fabrication of the carbon layer 370. For example, in the fabrication process, deposition of intervening magnetic layers 358 may simply be skipped for the sample 350'. Thus, providing the sample carbon layer 370' may be performed substantially simultaneously as the carbon layer 370 of the magnetic media 350. In addition, because it is deposited in the same manner, the sample carbon layer 370' should have substantially the same thickness as the carbon layer 370.

After fabrication, the sample 350' is used to interrogate the thickness of the carbon layer 358 using Raman spectroscopy. Thus, the sample 350' is exposed to light from a light source, such as a laser, via step 306. In some embodiments, the laser light may be processed prior to entering the sample 350'. Further, different portions of the sample 350' may be interrogated in step 306. Thus, the laser light may be incident on different portions of the sample 350'.

Light emitted from the sample 350' is detected to provide a Raman spectrum, via step 308. In some embodiments, the light from the sample 350' may be processed prior to being detected. Further, data may be collected from different portions of the sample 350' in step 308. The light emitted from the sample 350' has a frequency shift that is characteristic of the material(s) from which the incident light is scattered. Thus, one or more Raman spectra for the carbon layer 370' may be obtained. The thickness of the sample carbon layer 370', and thus the carbon layer 370, may be determined based on the Raman spectra, via step 310. In some embodiments, this determination is made using the total area under the curves for the D-band contribution and the G-band contribution.

The method 300 has analogous benefits as the methods 100 and 200. Thus, the thickness of the sample carbon layer 370' may be determined via Raman spectroscopy. Because the sample carbon layer 370' corresponds to the carbon layer 370, the thickness of the carbon layer 370 may also be determined. Because the magnetic and other layers 358 which increase surface roughness are omitted in the sample 350', Raman spectroscopy for the sample 350' is not adversely affected. Thus, Raman spectroscopy is capable of providing a sufficiently accurate determination of the thickness of the carbon layer(s) 370 and 370'. In addition, because the steps of depositing the layer(s) 358 are simply omitted for the sample 350', the preparation of the sample 350' is simplified.

We claim:

1. A method for interrogating a thickness of a carbon layer residing on a magnetic media having an underlayer and at least one magnetic layer on the underlayer, the carbon layer residing on the at least one magnetic layer comprising:
   depositing a sample underlayer on a sample substrate corresponding to a substrate including the magnetic media, the sample underlayer corresponding to the underlayer of the magnetic media;
   providing a sample carbon layer on the sample underlayer, the sample carbon layer corresponding to the carbon layer, a region between the sample carbon layer and the sample underlayer being free of magnetic material;
   exposing the sample substrate including the sample carbon layer to light from a light source;
   detecting emitted light from the sample substrate to provide a Raman spectrum; and
   determining the thickness of the carbon layer based on the Raman spectrum.

2. The method of claim 1 wherein the carbon layer is a carbon overcoat layer.

3. The method of claim 1 wherein the step of providing the sample carbon layer further includes:
   chemical vapor depositing a first carbon layer; and
   sputtering a second carbon layer on the first carbon layer, the sample carbon layer including the first carbon layer and the second carbon layer.

4. The method of claim 1 wherein the underlayer and the sample underlayer each further includes at least one of Ta and a soft magnetic underlayer.

5. The method of claim 1 wherein the sample carbon layer has a disordered band (D-band) and a graphite band (G-band) and wherein the Raman spectrum includes a D-band contribution and a G-band contribution.

6. The method of claim 5 wherein the thickness is determined based on a total area of the D-band contribution and the G-band contribution.

7. The method of claim 1 wherein magnetic media is fabricated in twelve-hour shifts, and wherein the step of depositing the sample underlayer is performed twice per shift.

8. The method of claim 7 wherein the step of providing the sample carbon layer is performed substantially simultaneously as the carbon layer of the magnetic media is provided.

9. The method of claim 1 wherein magnetic media is fabricated in twelve-hour shifts, and wherein the step of depositing the sample carbon layer is performed once per shift.

10. The method of claim 1 wherein the step of depositing the sample underlayer is performed substantially simultaneously as a deposition of the underlayer of the magnetic media.

11. The method of claim 1 wherein the magnetic media is a perpendicular magnetic media.

12. The method of claim 1 wherein the sample carbon layer adjoins the sample underlayer.

13. The method of claim 1 wherein the carbon layer has a thickness of not more than fifteen Angstroms.

14. The method of claim 1 wherein the thickness of the sample carbon layer is substantially equal to a carbon layer thickness for the carbon layer of the magnetic media.

15. The method of claim 14 wherein the thickness of the sample carbon layer is at least fifteen Angstroms.

16. The method of claim 14 wherein the thickness of the sample carbon layer is at least twenty Angstroms.

17. A method for interrogating a thickness of a carbon layer residing on a magnetic media having a Ta underlayer and at least one magnetic layer on the Ta underlayer, the carbon layer residing on the at least one magnetic layer, the method comprising:
   depositing a sample Ta underlayer on a sample substrate corresponding to a substrate including the magnetic media, the sample Ta underlayer corresponding to the Ta underlayer of the magnetic media and being deposited substantially simultaneously as the Ta underlayer;
   providing a sample carbon layer directly on the sample Ta underlayer, the sample carbon layer corresponding to the carbon layer and being deposited substantially simultaneously as the carbon layer, the step of providing the sample carbon layer being performed after the at least one magnetic layer is provided for the magnetic media, the sample carbon layer having a disordered band (D-band) and a graphite band (G-band);
   exposing the sample substrate including the sample carbon layer to light from a light source;

detecting emitted light from the sample substrate to provide a Raman spectrum including a D-band contribution and a G-band contribution; and determining the thickness of the carbon layer based on a total area of the D-band contribution and the G-band contribution of the Raman spectrum.

18. A method for interrogating a thickness of a carbon layer residing on a magnetic media having a soft magnetic underlayer, and at least one magnetic layer on the soft magnetic underlayer, the carbon layer residing on the at least one magnetic layer, the method comprising:

depositing a sample soft magnetic underlayer on a sample substrate corresponding to a substrate including the magnetic media, the sample soft magnetic underlayer corresponding to the soft magnetic underlayer of the magnetic media and being deposited substantially simultaneously as the soft magnetic underlayer;

providing a sample carbon layer directly on the sample soft magnetic underlayer, the sample carbon layer corresponding to the carbon layer and being deposited substantially simultaneously as the carbon layer, the step of providing the sample carbon layer being performed after the at least one magnetic layer is provided for the magnetic transducer, the sample carbon layer having a disordered band (D-band) and a graphite band (G-band);

exposing the sample substrate including the sample carbon layer to light from a light source;

detecting emitted light from the sample substrate to provide a Raman spectrum including a D-band contribution and a G-band contribution; and determining the thickness of the carbon layer based on a total area of the D-band contribution and the G-band contribution of the Raman spectrum.

\* \* \* \* \*